US008047703B2

(12) United States Patent
Elliott et al.

(10) Patent No.: US 8,047,703 B2
(45) Date of Patent: Nov. 1, 2011

(54) APPARATUS AND METHOD FOR GELLING LIQUEFIED GASSES

(75) Inventors: Adam Elliott, Hollywood, AL (US); Roberto DiSalvo, Madison, AL (US); Phillip Shepherd, Hollywood, AL (US); Ryan Kosier, Athens, AL (US)

(73) Assignee: CFD Research Corporation, Huntsville, AL (US)

( * ) Notice: Subject to any disclaimer, the term of this patent is extended or adjusted under 35 U.S.C. 154(b) by 0 days.

(21) Appl. No.: 12/874,242

(22) Filed: Sep. 2, 2010

(65) Prior Publication Data

US 2010/0319822 A1 Dec. 23, 2010

Related U.S. Application Data

(62) Division of application No. 11/584,954, filed on Oct. 23, 2006, now Pat. No. 7,810,990.

(51) Int. Cl.
*B01F 3/12* (2006.01)
*B01J 13/00* (2006.01)

(52) U.S. Cl. ........ 366/256; 366/139; 366/149; 366/241; 366/242; 366/255; 516/98; 516/99; 516/110; 516/111

(58) Field of Classification Search ...... 149/1; 366/139, 366/149, 241, 242, 255, 256; 516/98, 99, 516/110, 111
See application file for complete search history.

(56) References Cited

U.S. PATENT DOCUMENTS

2002/0196704 A1* 12/2002 May .............................. 366/256
2005/0158477 A1* 7/2005 Vezin et al. ................ 427/430.1

* cited by examiner

*Primary Examiner* — Jerry A Lorengo
*Assistant Examiner* — Jared Wood
(74) *Attorney, Agent, or Firm* — Tomas Friend

(57) ABSTRACT

A method and apparatus for gelling liquid propane and other liquefied gasses includes a temperature controlled churn mixer, vacuum pump, liquefied gas transfer tank, and means for measuring amount of material entering the mixer. The apparatus and method are particularly useful for the production of high quality rocket fuels and propellants.

9 Claims, 2 Drawing Sheets

APPARATUS AND METHOD FOR GELLING LIQUEFIED GASSES

CROSS-REFERENCE TO RELATED APPLICATIONS

This Application is a Divisional of and claims priority under 35 U.S.C. 120 to U.S. application Ser. No. 11/584,954, filed 23 Oct. 2006.

FEDERALLY SPONSORED RESEARCH OR DEVELOPMENT

The U.S. Government may have certain rights in this invention pursuant to SBIR Contract No. NNM05AA56C awarded by NASA.

BACKGROUND OF THE INVENTION

1. Field of the Invention

The present invention relates to methods and apparatuses for gelling liquefied gasses such as liquid propane (LP), liquid methane ($LCH_4$), liquid mixed oxides of nitrogen, (MON-X), or cryogenic liquids such as liquid oxygen (LOX). The apparatus includes a churn mixer specially adapted for liquefied gasses and the associated method produces gelled rocket propellants and other useful gelled liquefied gasses.

2. Description of Related Art

Methods and apparatus for gelling rocket fuels are known in the art. Methods of gelling liquefied gasses and cryogenic liquids can be found in the following patents, which are incorporated by reference. U.S. Pat. No. 4,011,730 discloses crystals of ice or methyl alcohol as gelling agents to gel liquefied natural gas in order to improve transportation efficiency by displacing inert gasses normally dissolved in the fuel. U.S. Pat. No. 4,295,346 discloses a system for gelling cryogenic liquids, including rocket fuels, using crystallized vapor droplets as gellant. U.S. Pat. No. 4,305,256 describes a process for making methane cryogenic liquid gels by forming a mixture of cryogen vapor and droplets and combining the mixture with a gelling agent that is a liquid or gas at ambient temperature but a solid at cryogenic temperatures. U.S. Pat. No. 5,705,771 provides a cryogenic rocket propellant comprising a slurry of solid methane in liquid hydrogen.

The preceding inventions are directed to the large-scale preparation of gelled liquefied gasses or cryogenic liquids. Small rocket motors, such as those used to provide attitude control require fuels of high quality and reliability and in smaller amounts than booster rockets, and other large rocket motors. Apparatus and methods are needed for the production of high quality gelled liquefied gasses with uniform distribution of gellant and particulate dopants and desirable rheological properties. The present invention provides apparatus and methods to satisfy this need and has been demonstrated for the production of gelled liquid propane (GLP) and mixed oxides of nitrogen (MON), including 70% $N_2O_4$+30% NO (MON-30). The products are of high quality and made in amounts suitable for rocket motors such as those found in divert and attitude control systems.

BRIEF SUMMARY OF THE INVENTION

The present invention is an apparatus and method for producing gelled liquefied gasses, including, for example, GLP and MON-30. The apparatus and method are particularly well-suited for making gelled propellants for high-performance upper stage and Divert and Attitude Control Systems, but can also be used for the production of gelled liquefied gasses for other purposes such as propellants for automobile airbag inflators, emergency escape systems for aircraft, underwater propulsion, and fuel cell fuels. The apparatus and method produce gels in which gellants, such as silicon dioxide, clay, carbon, or organic polymers such as hydroxypropyl cellulose, inorganic polymers and additives, such as powders of boron, carbon, lithium, aluminum, and/or titanium are homogeneously dispersed in the final product. The use of additives produces doped gels with improved function such as hypergolicity, higher specific impulse (Isp), density impulse, and desired rheological properties.

DETAILED DESCRIPTION OF THE INVENTION

Figure 1:
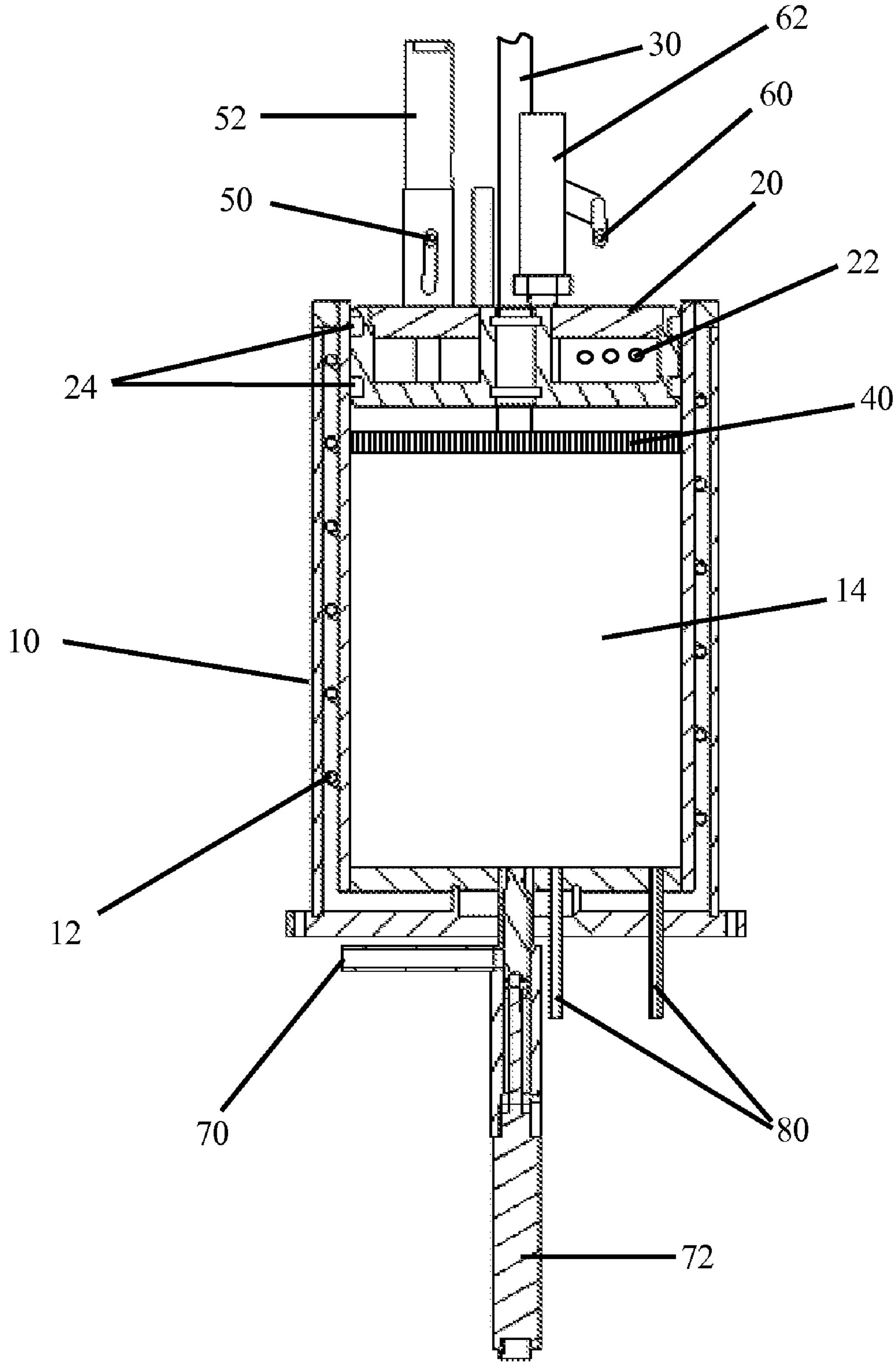
FIG. 1 shows a cut away view of a temperature controlled churn mixer.

In the example provided, LP is gelled using a one-liter, temperature controlled churn-mixer (FIG. 1). The mixer comprises a cylindrical vessel 10 with a heat exchange coil 12 located in the side and bottom walls of the vessel. The exterior surfaces of vessel 10 are thermally insulated with high density foam, polystyrene foam, or other high R value insulator (not shown). The heat exchange coil in this case comprises copper tubing in liquid communication with a cooling pump that circulates cooling liquid such as chilled ethylene glycol, ethanol, acetone, or freon to control temperature inside the mixer. The vessel volume 14 is set by positioning a piston-like closure lid, or follower plate, 20 at a set distance from the bottom of the vessel and securing it in place by compression of o-rings 24. Follower plate 20, comprises a heat exchange coil 22 or a void volume for circulating a cooling liquid. This arrangement provides temperature control on all surfaces in contact with vessel lumen volume 14. A rod 30, attached externally to a pneumatic actuator, goes through the center of the closure-lid and attaches to a perforated churn-plate 40. In this example, the churn-plate has thirty-six, 6 mm diameter holes and is pneumatically cycled up and down, through the entire mixer volume. Ports 50 and 60 are for connection to a liquefied gas transfer tank and vacuum pump, respectively. The ability to evacuate the mixing chamber before the introduction of liquefied gas prevents the formation of bubbles during the mixing process. A third port 70 is located at the bottom of the mixer for removing GLP or other gelled product from the mixer and can also be used to in some embodiments as a port for filling the chamber in a manner similar to filling a syringe. Pneumatically actuated zero void volume valves 52, 62, and 72 are used to regulate flow through ports 50, 60, and 70, respectively. Two thermocouples 80 and two pressure sensors, not shown, are used to monitor temperature and pressure inside the vessel.

The churn mixer may be scaled up or down to 500 liters, 200 liters, 50 liters, 10 liters, or 0.5 liters, for example. The mixing vessel components may be made of any material resistant to the chemicals, temperatures and pressures used in the gelling process. In the present example, the mixer and transfer tank are made of aluminum. Other materials such as stainless steel may and borosilicate glass may also be used. Pneumatically actuated zero void volume valves are preferred but other types of valves may be used.

EXAMPLE 1

Gelling Liquid Propane

Figure 2:
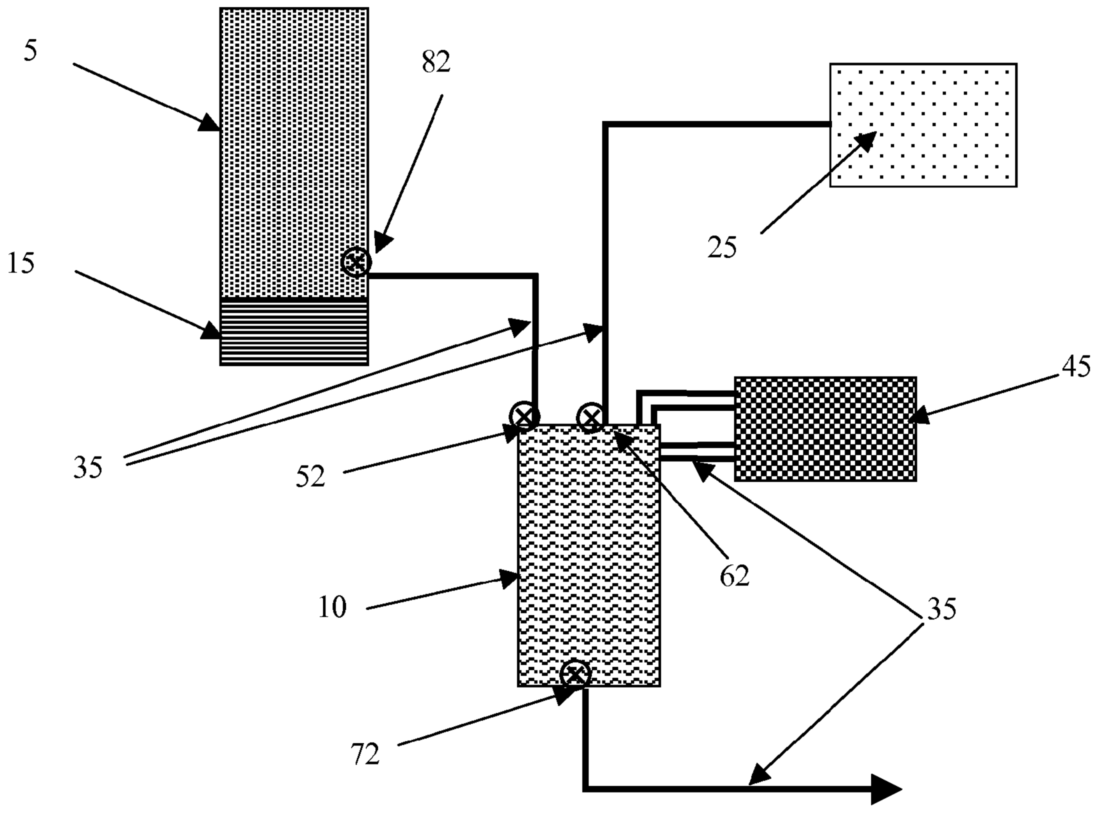
FIG. 2 is a diagram showing components of the gelling method.

A schematic of the components used in the gelling method is shown in FIG. 2 and comprises an aluminum storage tank 5 located on scale 15, vacuum pump 25, churn mixer vessel 10, connecting lines 35, cooling bath 45 for circulating ethanol chilled with dry ice, and valves 52, 62, 72, and 82. The outer surfaces of mixer vessel 10 and the follower plate (not shown) are insulated with a removable, high-density foam insulating material. Connecting lines 35 are flexible, stainless steel braided lines coated with Teflon®.

20 grams of Cabot M-5® fumed silica were placed in mixing vessel 10. The follower plate was lowered into the mixing vessel until the churn plate contacted the gellant. The vessel was sealed by compressing o-rings in the flower plate. Transfer tank 5 and mixing vessel 10 were evacuated using vacuum pump 25 with valve 72 closed and valves 52, 62, and 82 open. Valves 52, 62, and 82 were then closed and LP was transferred from an LP tank (not shown) into the evacuated transfer tank through a fill valve (not shown). Scale 15 was used to monitor the mass of the propane in the aluminum tank during transfer. The fill valve was then closed.

The temperature inside the transfer tank and mixing vessel was lowered to −45° C. to prepare the propane gel mixer for propane transfer. The mixer was cooled after vacuum was reached in order to prevent condensation inside the mixer. Valve 82 was slowly opened to fill connecting line 35 between the transfer tank and the mixer. The mass of LP lost from the transfer tank to the transfer line was recorded. Valve 52 was slowly opened to allow LP from transfer tank 5 into mixing vessel 10. The follower plate was pulled upward by a pneumatic actuator to draw liquid propane into the mixing vessel until 500 grams of propane was transferred into the mixer and valve 52 was closed. LP and gellant were mixed with a churn plate frequency of 1 Hz for 2 minutes. Valve 72 was opened and GLP was pressed from the mixer into a storage container by moving the follower plate to the bottom of the mixing vessel.

EXAMPLE 2

Gelling MON-30

The apparatus used is the same as for gelling liquid propane with the exception that the o-rings (24 in FIG. 1) were made of the MON-resistant material Kalrez®. Storage tank 5 was filled with MON-30 from a holding tank rather than LP and the temperature in the mixer was maintained between −1° C. and −8° C.

It is possible to gel liquefied gasses having lower boiling points and higher vapor pressures than LP as long as the combination of temperature and pressure in the mixing chamber maintain the liquefied gas in the liquid state. Extremely low temperatures can be achieved by using liquid nitrogen or liquid helium as the circulating fluid for heat exchange.

The above examples are presented for illustrative purposes to describe the present apparatus and method. Although particular embodiments of the present invention have been described, it is not intended that such references be construed as limitations upon the scope of this invention except as set forth in the following claims.

The invention claimed is:

1. A Method for gelling a liquefied gas comprising the steps of:

a) placing a gellant in a plate churn mixer, b) applying a vacuum to the plate churn mixer, c) cooling the plate churn mixer to a temperature less than 0° C., d) introducing liquefied gas into the plate churn mixer, and e) mixing the gellant with the liquefied gas while maintaining the plate churn mixer at a temperature of less than 0° C. to form a gelled liquefied gas wherein said plate churn mixer comprises:

a cylindrical mixing vessel that is open at one end and sealed at the other end and comprising a means for circulating heat exchange fluid within walls of the mixing vessel, a closure lid that fits inside the open end of the mixing vessel, said closure lid comprising an opening and o-rings configured to seal the closure lid against the inside walls of the mixing vessel upon compression of the o-rings and means for circulating a heat exchange fluid within the closure lid, a rod passing through the opening in the closure lid and attached to a perforated plate located inside the mixing vessel and mechanically coupled to a means for moving the perforated plate back and forth between the ends of the mixing vessel, at least one valved port in the mixing vessel or closure lid configured for delivering liquefied gas into or removing gelled liquefied gas from the mixing vessel, and at least one valved port in the mixing vessel or closure lid configured for evacuating the mixing vessel, and a supply of heat exchange fluid in fluid communication with said means of circulating heat exchange fluid in the walls of the vessel and the closure lid, said supply of heat exchange fluid being configured to maintain said heat exchange fluid at a temperature of 0° C. or lower.

2. The method of claim 1, wherein the plate churn mixer has a volume of between 0.1 liter and 500 liters.

3. The method of claim 1, wherein the liquefied gas is propane or a mixed oxide of nitrogen.

4. The method of claim 1, wherein the gellant is silicon dioxide, clay, carbon, or an organic or inorganic polymer.

5. The method of claim 4, wherein the gellant is doped with one or more dopants.

6. The method of claim 5, wherein the one or more dopants are selected from the group consisting of boron, carbon, lithium, aluminum, and titanium.

7. The method of claim 1, wherein the plate churn mixer is cooled to and maintained at a temperature of −45° C.

8. The method of claim 1, wherein the perforated plate consists of a metal plate comprising holes having diameters of between 4 and 8 mm.

9. The method of claim 1, wherein the gelled liquefied gas is a rocket propellant.

* * * * *